United States Patent
Wenderoth et al.

(10) Patent No.: US 7,393,464 B2
(45) Date of Patent: Jul. 1, 2008

(54) COOLING AGENTS FOR COOLING SYSTEMS IN FUEL CELL DRIVES

(75) Inventors: Bernd Wenderoth, Birkenau (DE); Ladislaus Meszaros, Mutterstadt (DE); Stefan Dambach, Haβloch (DE); Uwe Fidorra, Wachenheim (DE); Marco Bergemann, Hockenheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 20 days.

(21) Appl. No.: 10/450,943

(22) PCT Filed: Dec. 14, 2001

(86) PCT No.: PCT/EP01/14786

§ 371 (c)(1),
(2), (4) Date: Jun. 18, 2003

(87) PCT Pub. No.: WO02/055630

PCT Pub. Date: Jul. 18, 2002

(65) Prior Publication Data

US 2004/0028971 A1 Feb. 12, 2004

(30) Foreign Application Priority Data

Dec. 20, 2000 (DE) .................. 100 63 951

(51) Int. Cl.
*C09K 5/00* (2006.01)
*H01M 8/18* (2006.01)

(52) U.S. Cl. .............. 252/71; 252/73; 252/75; 429/20; 429/26; 429/120

(58) Field of Classification Search .......... 252/75, 252/76, 78.3, 79, 387
See application file for complete search history.

(56) References Cited

U.S. PATENT DOCUMENTS

| 4,460,478 A * | 7/1984 | Mohr et al. ............ 252/75 |
| 4,676,919 A | 6/1987 | Zientek |
| 4,684,475 A | 8/1987 | Matulewicz |
| 5,000,866 A * | 3/1991 | Woyciesjes ........... 252/78.3 |
| 5,366,651 A | 11/1994 | Maes et al. |
| 5,454,967 A | 10/1995 | Pfitzner et al. |
| 6,080,331 A | 6/2000 | Meszaros et al. |
| 6,294,278 B1 | 9/2001 | Wohr et al. |
| 6,432,320 B1 | 8/2002 | Bonsignore et al. |
| 6,680,138 B1 * | 1/2004 | Honma et al. ............ 429/33 |

FOREIGN PATENT DOCUMENTS

| DE | 19802490 A1 | 7/1999 |
| DE | 19955704 A1 | 5/2001 |
| EP | 105 803 | 4/1984 |
| EP | 1009050 A2 | 6/2000 |
| EP | 1262535 A1 | 12/2002 |
| WO | 00/02974 A1 | 1/2000 |
| WO | 00/17951 | 3/2000 |
| WO | 00/17951 A1 | 3/2000 |
| WO | 01/23495 A1 | 4/2001 |

OTHER PUBLICATIONS

Derwent Abstract 99-420101 Aktiver Korrosionsschutz in Wabrigen Medien, Reinhard pp. 78-98, 1995.

* cited by examiner

*Primary Examiner*—Necholus Ogden
(74) *Attorney, Agent, or Firm*—Novak Druce + Quigg LLP

(57) ABSTRACT

The invention relates to antifreeze concentrates for cooling systems in fuel cell drives, from which are produced ready-to-use aqueous cooling agent compositions having a maximum conductivity of 50 μs/cm, based on alkylene glycols or the derivatives thereof, and containing orthosilicic acid esters of formula (I) wherein the variables $R^1$ to $R^4$ are the same or different and represent $C_1$-$C_{20}$ alkyl substituents, $C_2$-$C_{20}$ alkenyl substituents, $C_1$-$C_{20}$ hydroxyalkyl substituents, optionally substituted $C_6$-$C_{12}$ aryl substituents and/or glycol ether substituents of formula $(CH_2$—$CH_2$—$O)_n$—$R^5$ wherein $R^5$ represents hydrogen or $C_1$-$C_5$ alkyl and n represents a number between 1 and 5

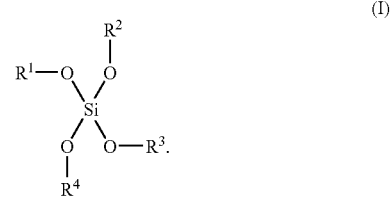

(I)

14 Claims, No Drawings

COOLING AGENTS FOR COOLING SYSTEMS IN FUEL CELL DRIVES

The present invention relates to coolants for cooling systems in fuel cell drives, in particular for motor vehicles, based on alkylene glycols or derivatives thereof, which contain orthosilicic esters as corrosion inhibitors.

Fuel cells for mobile use in motor vehicles must be capable of being operated also at low outdoor temperatures down to about −40° C.; a coolant circulation protected from freezing is therefore essential.

The use of radiator antifreezes conventionally used in internal combustion engines would not be possible in the case of fuel cells without complete electrical insulation of the cooling ducts, since, owing to the salts contained therein as corrosion inhibitors, these antifreezes have too high an electrical conductivity, which would adversely affect the operation of the fuel cell., DE-A 198 02 490 (1) describes fuel cells having a cooling circulation which contains an antifreeze and in which a paraffinic isomer mixture having a pour point of less than −40° C. is used as a coolant. However, the flammability of such a coolant is disadvantageous.

EP-A 1 009 050 (2) discloses a fuel cell system for automobiles, in which air is used as a cooling medium. The disadvantage here, however, is that air is known to be a poorer heat conductor than a liquid cooling medium.

WO 00/17951 (3) describes a cooling system for fuel cells, in which a pure monoethylene glycol/water mixture in the ratio 1:1, without additives, is used as a coolant. Since, owing to the absence of corrosion inhibitors, there has been no corrosion protection at all against the metals present in the cooling system, the cooling circulation contains an ion exchange unit to maintain the purity of the coolant and to ensure a low specific conductivity for a longer time, with the result that short-circuits and corrosion are prevented. Anionic resins, for example of the strongly alkaline hydroxyl type, and cationic resins, for example those based on sulfo groups, are mentioned as suitable ion exchangers, and oth r filtration units, for example active carbon filters, are mentioned.

The structure and the mode of operation of a fuel cell for automobiles, in particular a fuel cell comprising an electron-conducting electrolyte membrane (PEM fuel cell, polymer electrolyte membrane fuel cell) are described by way of example in (3), aluminum being a preferred metal component in the cooling circulation (radiator).

The use of silicon compounds, generally in the form of silicates, as corrosion inhibitors in radiator antifreezes for conventional internal combustion engines operated using gasoline or diesel fuel has long been known, for example from: G. Reinhard, "Aktiver Korrosionsschutz in wäβrigen Medien", pages 87-98, expert-Verlag 1995 (ISBN 3-8169-1265-6).

EP-A 105 803 (4) discloses the use of orthosilicic esters in addition to ionic corrosion inhibitors in radiator antifreezes for automobiles having conventional gasoline or diesel internal combustion engines.

The use of orthosilicic esters as corrosion inhibitors in coolants for cooling systems in fuel cell drives is unknown to date.

A principal problem in the case of cooling systems in fuel cell drives is the maintenance of low electrical conductivity of the coolant in order to ensure safe and trouble-free operation of the fuel cell and permanently to prevent short-circuits and corrosion.

Surprisingly, it has now been found that the duration of low electrical conductivity in a cooling system based on alkylene glycol/water, in particular if, according to (3), it contains an integrated ion exchanger, can be substantially increased by adding small amounts of orthosilicic esters; in practice, this has the advantage that the time intervals between two coolant changes in the case of fuel cell drives can be further extended, which is of interest particularly in the automotive sector.

Accordingly, we have found antifreeze concentrates for cooling systems in fuel cell drives, from which ready-to-use aqueous coolant compositions having a conductivity of not more than 50 μS/cm result and which are based on alkylene glycols or derivatives thereof, which concentrates contain orthosilicic esters of the formula (I)

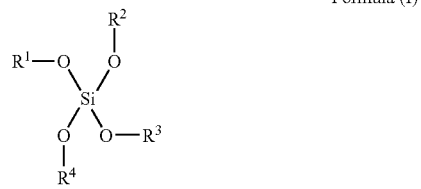

Formula (I)

where $R^1$ to $R^4$ are identical or different and are $C_1$- to $C_{20}$-alkyl, $C_2$- to $C_{20}$-alkenyl, $C_1$- to $C_{20}$-hydroxyalkyl, unsubstituted or substituted $C_6$- to $C_{12}$-aryl and/or a glycol ether substituent of the formula —$(CH_2$—$CH_2$—$O)_n$—$R^5$, where $R^5$ is hydrogen or $C_1$— to $C_5$-alkyl and n is from 1 to 5.

Preferred antifreeze concentrates here are those from which ready-to-use aqueous coolant compositions having a silicon content of from 2 to 2000, in particular from 10 to 1000, preferably from 25 to 500, especially from 40 to 250, ppm by weight, from orthosilicic esters of the formula I, result.

Typical examples of orthosilicic esters (I) used according to the invention are pure tetraalkoxysilanes, such as tetramethoxysilane, tetraethoxysilane, tetra-n-propoxysilane, tetraisopropoxysilane, tetra-n-butoxysilane, tetra-tert-butoxysilane, tetra(2-ethylbutoxy)silane and tetra(2-ethylhexyloxy)silane, and furthermore tetraphenoxysilane, tetra(2-methylphenoxy)silane, tetravinyloxysilane, tetraallyloxysilane, tetra(2-hydroxyethoxy)silane, tetra(2-ethoxyethoxy)silane, tetra(2-butoxyethoxy)silane, tetra(1-methoxy-2-propoxy)silane, tetra(2-methoxyethoxy)silane and tetra[2-[2-(2-methoxyethoxy)ethoxy]ethoxy]silane. The orthosilicic esters (I) used preferably have four identical variables $R^1$ to $R^4$.

In a preferred embodiment, orthosilicic esters (I) in which $R^1$ to $R^4$ are identical and are $C_1$- to $C_4$-alkyl or a glycol ether substituent of the formula —$(CH_2$—$CH_2$—$O)_n$—$R^5$, where $R^5$ is hydrogen, methyl or ethyl and n is 1, 2 or 3, are used.

Said orthosilicic esters (I) are either commercially available or can be prepared by simple transesterification of one equivalent of tetramethoxysilane with four equivalents of the corresponding longer-chain alcohol or phenol and by distilling off methanol.

Ready-to-use aqueous coolant compositions which have a conductivity of not more than 50 μS/cm and substantially comprise (a) from 10 to 90% by weight of alkylene glycols or derivatives thereof, (b) from 90 to 10% by weight of water and (c) from 2 to 2000, preferably from 25 to 500, ppm by weight of silicon from orthosilicic esters of the formula I can be prepared from the antifreeze concentrates by dilution with ion-free water. The sum of all components is 100% by weight here.

The present invention thus also relates to ready-to-use aqueous coolant compositions for cooling systems in fuel cell drives, which substantially comprise (a) from 10 to 90% by weight of alkylene glycols or derivatives thereof, (b) from 90 to 10% by weight of water and (c) from 2 to 2000, preferably from 25 to 500, ppm by weight of silicon from orthosilicic esters of the formula I and which are obtainable by diluting said antifreeze concentrates with ion-free water. The sum of all components is 100% by weight here.

The novel ready-to-use aqueous coolant compositions have an initial electrical conductivity of not more than 50, in particular 25, preferably 10, especially 5, µS/cm. The conductivity is kept at this low level in continuous operation of the fuel cell drive over several weeks or months, particularly if a cooling system comprising integrated ion exchanger-is-used in the fuel cell drive.

The pH of the novel ready-to-use aqueous coolant compositions decreases over the operating time-substantially more slowly than in the case of cooling liquids not containing added orthosilicic esters. The pH is usually from 4.5 to 7 in the case of fresh coolant compositions according to the invention and can decrease to 3.5 in continuous operation.

The ion-free water used for dilution may be pure distilled or bidistilled water or, for example, water demineralized by ion exchange.

The preferr d weight ratio in which an alkylene glycol or a derivative thereof is mixed with water in the ready-to-use aqueous coolant compositions is from 25:75 to 80:20, in particular from 35:65 to 75:25, preferably from 50:50 to 70:30, especially from 55:45 to 65:35. In particular, monoethylene glycol, but also monopropylene glycol, polyglycols, glycol ethers or glycerol, in each case alone or as mixtures thereof, can be used as alkylene glycol components or derivatives thereof. Monoethylene glycol alone or mixtures containing monoethylene glycol as the main component, i.e. having a content of more than 50, in particular more than 80, especially more than 95, % by weight in the mixture, with other alkylene glycols or derivatives of alkylene glycols are particularly preferred.

The dosage of the respective orthosilicic esters (I) in the ready-to-use aqueous coolant compositions is calculated from the above data by means of the silicon content based on (I).

The novel antifreeze concentrates themselves, from which the described ready-to-use aqueous coolant compositions result, can be prepared by dissolving the orthosilicic esters (I) in alkylene glycols or derivatives thereof, which may be used in anhydrous form or with a low water content (up to about 10, in particular up to 5, % by weight).

The present invention also relates to the use of orthosilicic esters of the formula I

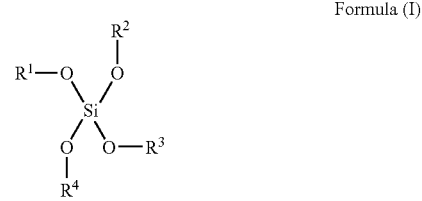

Formula (I)

where $R^1$ to $R^4$ are identical or different and are $C_1$- to $C_{20}$-alkyl, $C_2$- to $C_{20}$-alkenyl, $C_1$- to $C_{20}$-hydroxyalkyl, unsubstituted or substituted $C_6$- to $C_{12}$-aryl and/or a glycol ether substituent of the formula —$(CH_2$—$CH_2$—$O)_n$—$R^5$, where $R^5$ is hydrogen or $C_1$- to $C_5$-alkyl and n is from 1 to 5, for the preparation of antifreeze concentrates for cooling systems in fuel cell drives, in particular for motor vehicles, based on alkylene glycols or derivatives thereof.

The present invention furthermore relates to the use of the antifreeze concentrates described for the preparation of ready-to-use aqueous coolant compositions having a conductivity of not more than 50 µS/cm for cooling systems in fuel cell drives, in particular for motor vehicles.

EXAMPLES

The examples which follow illustrate the invention without restricting it.

The novel coolant compositions were tested with regard to their suitability for fuel cell drives by the test described below, in comparison with a coolant composition according to (3):

Description of Test:

Five aluminum test metals (vacuum-soldered Al, designation: EN-AW 3005, solder-plated on one side with 10% by weight of EN-AW 4045; dimensions: 58×26×0.35 mm, having a hole of 7 mm diameter) were weighed, connected non-conductively by means of a plastics screw with nut and Teflon washer and placed on two Teflon supports in a 1 l beaker with ground glass joint and glass cover. Thereafter, 1000 ml of test liquid were introduced and a small fabric bag containing 2.5 g of an ion exchanger (mixed bed ion exchanger resin AMBERJET UP 6040 RESIN from Rohm+Haas) was suspended in the liquid. The beaker was closed air-tight with the glass cover and heated to 88° C. and the liquid was stirred vigorously with a magnetic stirrer. The electrical conductivity was measured at the beginning of the test and after 7 and 42 (or after 77) days (conductivity meter LF 530 from WTW/Weilheim). The test was then terminated; the aluminum samples were assessed visually and, after pickling with aqueous chromic acid/phosphoric acid, were evaluated gravimetrically according to ASTM D 1384-94.

The results are shown in Table 1 below.

TABLE

| Coolant composition: | Comparative example (according to WO 00/17951): 60% by volume of monoethylene glycol 40% 40% by volume of water | Example 1: 60% by volume of monoethylene glycol 40% by volume of water 742 ppm by weight of tetraethoxysilane | Example 2: 60% by volume of monoethylene glycol 40% by volume of water 3600 ppm by weight of tetra[2-[2-methoxyethoxy)ethoxy]-silane |
|---|---|---|---|
| Electrical conductivity [μS/cm] | | | |
| Beginning of test: | 2.0 | 0.8 | 2.6 |
| After 7 days: | 2.3 | 0.8 | 2.2 |
| After 42 days: | 36.2 | 3.0 | 14.4 |
| After 77 days: | — | — | 18.6 |
| pH: | | | |
| Beginning of test | 6.9 | 6.6 | 4.7 |
| End of test: | 2.9 | 4.0 | 3.6 |
| Appearance | slightly stained | stained | stained |
| Aluminum samples after the test: Weight change [mg/cm²] After pickling: | | | |
| 1 | −0.05 | −0.02 | −0.02 |
| 2 | −0.04 | −0.01 | −0.02 |
| 3 | −0.04 | −0.02 | −0.04 |
| 4 | −0.04 | −0.02 | −0.04 |
| 5 | −0.03 | −0.02 | −0.04 |
| Mean value of the 5 samples | −0.04 | −0.02 | −0.03 |
| Solution after end of test | yellowish, clear | colorless, clear | yellowish, clear |

In the mixture of monoethylene glycol and water, the volume ratio of 60:40 corresponds to a weight ratio of 62.5:37.5.

In the novel examples 1 and 2, the orthosilicic esters were metered so that a silicon content of 100 ppm by weight in each case was present in the cooling liquid.

The results show that a very low electrical conductivity of less than 5 μS/cm was still present even after an uninterrupted test period of 42 days in the case of the novel example 1, whereas a substantial deterioration had occurred, with an increase to virtually 40 μS/m, in the case of the additive-free coolant according to WO 00/17951 (3). However, with the novel example 2 which was slightly poorer compared with example 1 after 42 days, the specific conductivity was still about 50% lower even after a test period of 72 days than in the case of the comparative example after a test duration of 42 days.

In no case did significant corrosion occur on the aluminum samples.

What is claimed is:

1. A method of protecting fuel cell drives from corrosion using cooling systems which are based on antifreeze concentrates based on alkylene glycols or derivatives thereof, from which ready-to-use aqueous coolant compositions having a conductivity of not more than 50 μS/cm result, wherein the anti-freeze concentrates contain orthosilicic esters of the formula I

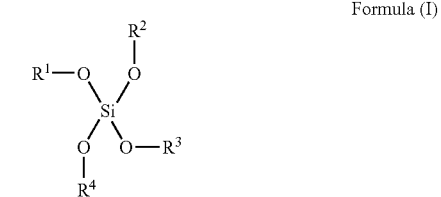

where $R^1$ to $R^4$ are identical or different and are $C_1$- to $C_{20}$-alkyl, $C_2$- to $C_{20}$-alkenyl, $C_1$- to $C_{20}$-hydroxyalkyl, unsubstituted or substituted $C_6$- to $C_{12}$-aryl and/or a glycol ether substituent of the formula —$(CH_2$—$CH_2$—$O)_n$—$R^5$, where $R^5$ is hydrogen or $C_1$- to $C_5$-alkyl and n is from 1 to 5.

2. A method as claimed in claim 1, wherein the antifreeze concentrates result in ready-to-use aqueous coolant compositions having a silicon content of from 2 to 2000 ppm by weight, from orthosilicic esters of the formula I.

3. A method as claimed in claim 1, wherein the antifreeze concentrates contain orthosilicic esters of the formula I, in which $R^1$ to $R^4$ are identical and are $C_1$- to $C_4$-alkyl or a glycol ether substituent of the formula —$(CH_2$—$CH_2$—$O)_n$—$R^5$, where $R^5$ is hydrogen, methyl or ethyl and n is 1, 2 or 3.

4. A method as claimed in claim 1, wherein the alkylene glycol used for the antifreeze concentrates is monoethylene glycol.

5. A method as claimed in claim 1, wherein ready-to-use aqueous coolant compositions which have a conductivity of not more than 50 μS/cm and substantially comprise
   (a) from 10 to 90% by weight of alkylene glycols or derivatives thereof,
   (b) from 90 to 10% by weight of water and
   (c) from 2 to 2000 ppm by weight of silicon from orthosilicic esters of the formula I
are produced from the antifreeze concentrates by dilution with ion-free water.

6. The method of claim 2 wherein the silicon content is from 25 to 500 ppm.

7. The method of claim 5 wherein the silicon content is from 25 to 500 ppm.

8. The method of claim 1, wherein the cooling system is in a fuel cell which contains an electron-conducting electrolyte membrane.

9. The method of claim 1, wherein the conductivity of the ready-to-use aqueous coolant compositions is not more than 25 μS/cm.

10. The method of claim 1, wherein the conductivity of the ready-to-use aqueous coolant compositions is not more than 10 μS/cm.

11. The method of claim 1, wherein the conductivity of the ready-to-use aqueous coolant compositions is not more than 5 μS/cm.

12. The method of claim 5, wherein the conductivity of the ready-to-use aqueous coolant compositions is not more than 25 μS/cm.

13. The method of claim 5, wherein the conductivity of the ready-to-use aqueous coolant compositions is not more than 10 μS/cm.

14. The method of claim 5, wherein the conductivity of the ready-to-use aqueous coolant compositions is not more than 5 μS/cm.

* * * * *